United States Patent [19]

Brown et al.

[11] Patent Number: 4,588,602

[45] Date of Patent: May 13, 1986

[54] COLD WATER SOLUBLE GELATIN

[75] Inventors: James Brown, Huntington, Conn.; Peter E. Ellis, Riverdale, N.Y.; Marta J. Draper, Westport, Conn.

[73] Assignee: Nabisco Brands, Inc., Parsippany, N.J.

[21] Appl. No.: 704,784

[22] Filed: Feb. 25, 1985

[51] Int. Cl.$^4$ ................................................ A23L 1/04
[52] U.S. Cl. ...................... 426/576; 426/443; 426/518; 426/455; 426/456; 426/96
[58] Field of Search ............... 426/576, 443, 455, 456, 426/465, 518, 96

[56] References Cited

U.S. PATENT DOCUMENTS

| | | | |
|---|---|---|---|
| 2,803,548 | 8/1957 | Hagerty | 99/130 |
| 2,819,970 | 1/1958 | Steigmann | 99/130 |
| 2,819,971 | 1/1958 | Gunthardt | 99/130 |
| 2,841,498 | 7/1958 | Cahn et al. | 99/130 |
| 2,948,622 | 8/1960 | Cahn | 99/130 |
| 3,595,675 | 7/1971 | Ash | 426/576 |
| 3,904,771 | 9/1975 | Donnelly | 426/576 |
| 3,927,221 | 12/1975 | Kalafatas et al. | 426/576 |
| 3,930,052 | 12/1975 | De Brou | 426/576 |
| 4,401,685 | 8/1983 | Brown et al. | 426/576 |
| 4,407,836 | 10/1983 | Bosco et al. | 426/576 |
| 4,409,255 | 10/1983 | Danielson et al. | 426/576 |

FOREIGN PATENT DOCUMENTS 896965  4/1972  Canada ................................. 99/130

*Primary Examiner*—Jeanette Hunter
*Attorney, Agent, or Firm*—Richard Kornutik

[57] ABSTRACT

Disclosed are an improved cold water soluble gelatin and a process of preparing it. The improved cold water soluble gelatin is prepared by a process which includes the steps of preparing an aqueous solution comprising water, gelatin and sugar containing corn syrup solids and maltodextrin, drying the solution and comminuting and screening the dried material so obtained to a particle size from about 20 to about 200 U.S. mesh wherein at least about 40 percent by weight of the particles will pass through U.S. mesh greater than 100.

13 Claims, No Drawings

COLD WATER SOLUBLE GELATIN

BACKGROUND OF THE INVENTION

The present invention relates to cold water soluble gelatin; and, particularly, to an improved cold water soluble gelatin product and a process for preparing it.

Gelatin is a widely used food ingredient. It has the ability to thicken or otherwise improve the texture of a variety of liquid products and also to set to a heat reversible gel which is useful in preparing products such as gelatin desserts. In products such as salad dressings, it aids in suspending particulate ingredients, and in frozen products such as ice cream it has the ability to retard the growth of ice crystals.

The art has long recognized a need for cold water soluble gelatin products. Unfortunately, it has been difficult until this time to achieve good solubility for gelatin in cold water. One area in particular where cold water solubility would be desirable is for the preparation of gelatin dessert mixes. There is a growing demand for all categories of food products which can be fully prepared and ready for consumption in the shortest period of time. The vast majority of gelatin dessert mixes which are currently available require the use of hot or boiling water to dissolve the gelatin and extended times, on the order of from about 2 to 4 hours, to permit them to achieve the proper consistency for eating. Thus, these products are often viewed as inconvenient because they require the use of hot or boiling water and also because of the extended setting time before they can be enjoyed. Because of this, many consumers who enjoy eating gelatin desserts and salads prepared with them forego their use because they perceive them as too inconvenient.

This problem was recognized by Hagerty in U.S. Pat. No. 2,803,548 wherein he disclosed that a room-temperature soluble gelatin could be prepared by drying a gelatin solution at reduced pressure within a relatively narrow temperature range of between 37° and 70° C. According to his procedure, an aqueous gelatin solution, preferably containing a sugar such as sucrose, was first prepared by heating and was then dried at the indicated temperatures at pressures of from 50 to 100 millimeters of mercury. The disclosure emphasizes the need to dry at the indicated temperatures at pressures of from 50 to 100 millimeters of mercury. The disclosure emphasizes the need to dry at the indicated temperatures and states where dextrose or corn syrup are substituted for the sucrose, a dense, rather than fluffy, product is produced. While the patent suggests that the material is soluble in cold water, no specific details as to water temperature or time for solution are given. The patent does indicate, however, that gel strength of products prepared according to the disclosure are about 10% less than those prepared by conventional techniques.

In U.S. Pat. No. 2,948,622, Cahn discloses that a hot solution comprising about one part gelatin, nine parts sugar and 10 parts water can be dried as a thin film, and that the dry product is soluble in cold tap water. Contrary to the disclosure of Hagerty, Cahn indicates that the temperature should be between 70° and 120° C. and the pressure should be near atmospheric. He indicates, however, that pressures down to about 0.75 atmospheres can also be employed. While the exact conditions of dissolution of the final product in cold water are not given, it is indicated that the product of at least one example can be dissolved in cold water and then fully set by cooling for about 45 minutes at a temperature of 10° C.

In addition to the batch drying process of Hagerty and the atmospheric drum drying process of Cahn, these two workers together disclosed in U.S. Pat. No. 2,841,498 that a cold water soluble gelatin could be prepared by spray drying an aqueous solution of sucrose and gelatin, provided that the sucrose content was at least 8 times, and preferably on the order of 9 or 10 times, the gelatin content. This disclosure is very specific as to the need for sugar to be sucrose and that the sucrose be present in a specific concentration. While other sugars such as dextrose and corn syrup solids are disclosed, they are mentioned only for admixture with the spray dried product. Cahn and Hagerty disclose that after dissolving their product in cold water, it sets to a gel within between about 7 to 15 minutes when cooled to about 32° F., and a solution at 75° F. when placed in an ordinary kitchen refrigerator sets to a firm gel therein in about one and one-half hours. It is disclosed that the acid component can be included prior to drying if desired.

In Canadian Pat. No. 896,965 to de Boer and U.S. Pat. No. 3,904,771 to Donnelly et al, there are described procedures for preparing various cold water soluble gelatin products by spray drying solutions comprising gelatin and an acid. Donnelly et al disclose that in addition to the acid which is employed at a level of from about 30 to 200% by weight of gelatin, the solution can contain a sugar such as fructose or sucrose prior to spray drying. In the Canadian patent, however, de Boer indicates that sugar can be eliminated from the spray drying solution where the acid is employed at a level of from about 5 to about 20% based upon the weight of the gelatin. According to de Boer, spray drying the dilutely acid gelatin solution permits the formation of fine droplets for enhanced drying.

According to the disclosure of Kalafatas in U.S. Pat. No. 3,927,221, the need for elaborate or extensive drying systems of the type described in U.S. Pat. Nos. 2,803,548, 2,841,498 and 2,948,622 can be obviated by the use of an extrusion process. According to this disclosure, the cold water soluble gelatin composition is prepared by subjecting a sugar/gelatin admixture to heat and pressure while applying shearing forces to the admixture in an extruder. The products are said to dissolve in water at about 50° F. after 2 minutes of spoon stirring. The solutions prepared in this manner are set after about two hours refrigeration, as compared to about four hours when hot water is used to dissolve conventional gelatin dessert mixes. The disclosure incidentally mentions the use of dispersants, wetting agents and emulsifiers to enhance dispersibility. Similarly, U.S. Pat. No. 2,819,970 to Steigmann and U.S. Pat. No. 2,819,971 to Gunthardt also mention the use of additives of this type.

Recently issued U.S. Pat. Nos. 4,401,685; 4,407,836; and U.S. Pat. No. 4,409,255 describe processes for the preparation of cold water soluble gelatins which possess markedly improved properties as compared with those previously known in the art. These patents all call for the use of a particular sugar composition, namely a mixture of corn syrup solids and maltodextrin, in combination with gelatin in a range of ratio of sugar to gelatin by weight of 2:1 to 12:1 preferably 3-7:1. An aqueous solution is prepared containing the gelatin, sugar, an acid and a surfactant and the solution is dried. In U.S. Pat. No. 4,401,685, the drying is effected by spreading a thin layer of the solution on a surface heated with steam at 10–60 psig pressure. In U.S. Pat. No. 4,407,836 the solution is extruded as a foam and then dried.

It has now been found that cold water soluble gelatins having even more enhanced properties can be obtained by a modification of the processes described in the latter three patents set forth above, which modification is described in detail below.

SUMMARY OF THE INVENTION

It is an object of the present invention to provide a gelatin product which is completely dispersed and dissolved in cold water.

It is another object of the present invention to provide a cold water soluble gelatin product which, after dissolution in cold water, forms a gel of good strength and high quality in a conveniently short period of time.

It is another and more specific object of the present invention to provide a gelatin dessert mix which can be fully dissolved in tap water with vigorous spoon stirring and then set to a high quality dessert in a conveniently short period of refrigeration.

It is another object of the present invention to provide an improved process for preparing a cold water soluble gelatin product.

It is yet another and more specific object of the present invention to provide a process for preparing a cold water soluble gelatin product which is completely dissolved in cold tap water and is then fully set to form a high quality gel within a conveniently short period of refrigeration.

These and other objects are achieved according to at least the preferred embodiments of the present invention which provides a process for preparing a cold water soluble gelatin product, the product of that process, and a gelatin dessert mix which is fully soluble in cold water. The process according to the invention comprises: preparing an aqueous solution comprising water, gelatin, sugar containing corn syrup solids and/or maltodextrin, an acid and an amount of surface-active agent effective to increase dispersibility in the final product, drying the solution so prepared, and comminuting and screening the dried material so obtained to a particle size from about 20 to about 200 US mesh wherein at least about 40 percent by weight of the particles will pass through US mesh greater than 100.

The product of this process is useful in all applications where cold water solubility would be advantageous, and it is particularly useful in the preparation of gelatin dessert mixes which are fully soluble in cold water. The dessert mixes according to the present invention include acid, buffer, flavor and color, in addition to the cold water soluble gelatin prepared according to the process of the invention.

DETAILED DESCRIPTION OF THE INVENTION

The cold water soluble gelatin product prepared according to the present invention finds particular utility in gelatin dessert mixes, and will therefore be described in this environment as exemplary. This is not meant to imply, however, that other applications of the product are not intended. In fact, the products of the invention will be very useful in the preparation of salad dressings, ice cream, cake and pie mixes which require no baking, candies, and a wide variety of food products which currently employ gelatin or gelatin-like materials.

As a matter of definition, the term "cold water soluble" as used in the present application means that the product can be dissolved in tap water at the indicated concentration of usage in less than about 5 minutes, and preferably less than 1 minute, by stirring with a spoon to provide vigorous agitation. The temperature of tap water as delivered at the faucet can vary over a wide range generally from about 50° F. to about 70° F. although temperatures above and below this range can be encountered. The temperature of the tap water in any given instance can influence the rate at which a particular product of the invention will dissolve. Similarly, variation in mineral content of the tap water may also affect the rate at which the product dissolves.

The term "amorphous gelatin" as used herein means gelatin products which pass directly from the liquid solution to the dry state without forming a gelled state. Typically, amorphous gelatin products form clumps when mixed with cold water; however, these problems are alleviated according to the invention. Also by way of definition, all parts and percentages used throughout this disclosure are on a weight to weight basis, unless the contrary is indicated at the point of usage.

While the most important ingredient according to the present invention is gelatin, the particular type of gelatin employed is selected primarily based upon the intended use of the ultimate product, and not for any particular functionality of the gelatin within the process of the invention. Therefore, the cold water soluble gelatin products of this invention can be prepared from gelatins of either the Type A (acid) or Type B (alkali) forms. Similarly, the gelatin can be prepared from any collagen source including bone, hide and other collagen sources and can be derived from any suitable animal, including beef and pork sources. The bloom will typically be within the range of from about 150 to 275.

The process of the present invention represents an improvement or modification of that set forth in prior U.S. Pat. Nos. 4,401,685; 4,409,255 and 4,407,836 (hereinafter "the said prior patents"). The latter describe the preparation of an aqueous solution comprising gelatin and sugar followed by drying of the same using various drying procedures. As an optional step, the said prior patents disclose comminuting and classifying the dried material to a particle size of from about 12 to about 100 US mesh. It has now been found that further comminution and classifying of the dried material to give a particle size from about 20 to about 200 US mesh gives rise to a properties. Preferably the particle size distribution achieved in the end product is such that at least 40 percent by weight of the material will pass through US mesh greater than 100 and at least about 90 percent of the particles will pass through US mesh 30 and most will be retained on US mesh 200. Cold water soluble material prepared in accordance with the invention and having a particle size within the above range possesses enhanced water solubility and ease of dispersion and gives rise to gels which possess improved clarity as compared with the products prepared in accordance with the said prior patents.

The preparation of the initial aqueous solution and the drying of the same can be carried out using the procedures and ingredients described in the said prior patents whose disclosure is hereby incorporated herein by reference.

Illustratively, the aqueous solution comprising gelatin and sugar is prepared by heating the gelatin and sugar in the desired concentration in water, preferably to a temperature of about 150° to 180° F., to achieve complete solution. Typically, this is conducted by dissolving the gelatin in hot water first and then adding the sugar to the gelatin solution. Advantageously, a gelatin solution from a gelatin production process, typically containing about 15 to 20% gelatin can be mixed with the dry sugar or concentrated sugar solution to achieve the desired concentration. The gelatin concentration is typically within the range of from about 5 to about 25% and the sugar concentration is typically within the range of from about 20 to about 80%, based on the weight of the total solution. The ratio of sugar to gelatin is critical from a processing standpoint. Advantageously, the ratio is within the range of from greater than 2:1 up to about 12:1, and preferably is within the range of from about 3:1 to about 7:1. The total solids concentration of the solution for drying, including the sugar, gelatin and any other solid materials, is advantageously within the range of from about 30 to about 70%. A particularly useful concentration of total solids is of the order of 60%.

The terms "sugar" and "sugars" as they are employed in the present context are to be understood as meaning any of a number of useful saccharide materials which are capable of being dried under the conditions of processing of the invention to maintain the gelatin in an amorphous state. Saccharide materials which meet this definition will provide a degree of cold water solubility, and preferences for a specific material based upon its affinity for water or its contribution to the sweetness or the texture of the final product will control the final selection. Included in the list of useful sugars are mono-saccharides, disaccharides, and polysaccharides and their degradation products; e.g., pentoses, including aldol pentoses, methyl pentoses, keto pentoses, like xylose and arabinose; dioxy aldoses like rhamnose, hexoses and reducing saccharides such as aldo hexoses like glucose, galactose and mannose; and keto hexoses, like fructose and sorbose; disaccharides, like lactose and maltose; non-reducing disaccharides such as sucrose; and other polysaccharides such as raffinose and various hydrolyzed starch products which contain as their constituents oligo-saccharides and smaller molecules. Typical of the hydrolyzed starch materials are those from corn starch, e.g., corn dextrin (1–13DE), maltodextrin (13–23DE), and corn syrup (24+DE). Of these, corn syrups with DE values of 42 and below and maltodextrins are found to significantly improve drying and product solubility when used as major sugar constituents.

In addition to the gelatin and the sugar, the aqueous solution for drying can also comprise an acid suitable for food use as fumaric, citric, malic, adipic, ascorbic, tartaric, succinic, and phosphoric acids. Among these, fumaric, citric and adipic acids are preferred. The acid, when employed, is found to improve final product solubility and advantageously is present in a ratio of acid to gelatin within the range from about 0.05–0.5:1. More preferred ratios of acid to gelatin are within the range of from about 0.10–0.23:1 which range significantly improves product solubility and can provide all the acid that is required for a good tasting gelatin dessert. Where the acid is employed in the solution prior to drying, it may sometimes also be desirable to employ a suitable buffer such as a sodium or potassium salt of any of the above mentioned acids. The pH may be adjusted to within the range of from about 3 to about 4.5 by use of the buffering salts.

According to a preferred embodiment of the invention, the solution prior to drying also contains a surface-active agent, such as those known generically to the art as polysorbates, hydroxylated lecithin, acetylated mono-glycerides, succinylated monoglycerides, ethoxylated mono- and diglycerides, sodium stearoyl 2-lactylate and the like. These surface-active agents will be employed in amounts effective to render the dried product more easily dispersible in cold water. Exemplary of the polysorbate surface-active agents are polysorbate 60, polysorbate 65 and polysorbate 80. Polysorbate 60 is identified chemically as polyoxyethylene (20) sorbitan monostearate while polysorbate 65 is known as polyoxyethylene (20) sorbitan tristearate, and polysorbate 80 is known as polyoxyethylene (20) sorbitan monooleate. In addition to these materials, other surface-active agents which have the ability of increasing the dispersibility of the final product in cold water can also be employed. While the exact level of addition will be controlled based upon a balance between cost, effectiveness and taste, it is preferred to maintain the level within the range of from about 0.05 to about 7% based upon the weight of the gelatin to provide the desired degree of improvement in dispersibility without adversely affecting the ultimate rate of set or gel strength of the cold water soluble gelatin product produced according to the process of the invention.

The aqueous solution comprising gelatin, sugar, and any additional materials desired according to the above disclosure, is then dried using any of the procedures described in the said prior patents. Illustratively, the solution is applied in a thin layer to the surface of a suitable dryer, such as the Buflovak double drum vacuum drum dryer or vacuum drum dryer of similar type. Typically, the thickness of the layer will be within the range of from about 0.1 to about 2.0 millimeters. The surface of the dryer is preferably heated from the reverse side by steam to a temperature effective for drying the solution within a commercially practical period of time while maintaining the gelatin in the amorphous state. Typically, the residence time of the solution on the drying surface from the time of application to the time of complete drying will be less than about 5 minutes, preferably less than about 1 minute. Steam at a pressure of from about 15 to about 60 psig will be effective for supplying adequate heat. More typically, the steam pressure will be within the range of from about 5 to about 20 psig.

The solution is dried on the surface under a reduced pressure. Absolute pressures of less than about 5 inches of mercury are effective. The reduced pressure causes rapid volatilization of the water within the solution and creates a light, friable, flaky product which exhibits good cold water solubility immediately after removal from the surface by means of a knife-edged scraper blade or other suitable means. The dried material is then subjected to comminution and classifying, using conventional equipment, to achieve the desired particle size as discussed above.

Preferred bulk densities for the dry cold water soluble gelatin product of the invention will be within the range of from about 0.2 to about 0.3 grams per cubic centimeter.

The dried cold water soluble product prepared according to the process of the invention can be compounded with other typical ingredients of dry gelatin dessert mixes to prepare a gelatin dessert mix which is, itself, cold water soluble. Typically, the dry gelatin dessert mix prepared according to the invention will comprise the cold water soluble gelatin plus additional amounts of sweeteners, acidulents, buffers, flavors, antifoam agents, and colors for the desired effect in the final product. Where these materials are not added to the solution prior to drying, they can be added by dry mixing with the cold water soluble gelatin product after drying by simple dry blending or by blending and agglomeration. Typically where the sugar is sucrose, the ratio of sucrose to gelatin will be within the range of from about 9-15:1. And, where the acid is fumaric acid, the ratio of acid to gelatin will be within the range of from about 0.10-0.30:1. The buffer is preferably employed in an amount effective to adjust the pH of the final product to within the range of from about 3 to about 4.5. The flavorants and colorants are used in widely varying amounts, depending upon the desired end effect. The cold water soluble gelatin dessert can also contain vitamin and mineral supplements if desired.

The following examples are intended to further illustrate and explain the present invention but are not to be taken as limiting in any regard:

EXAMPLE 1

This example describes the preparation of a cold water soluble gelatin product according to the invention. A solution is prepared by admixing the following materials.

| Ingredients | Parts |
|---|---|
| Corn syrup 26DE (77.5% solids) | 508 |
| Beef gelatin 240 + bloom (91% solids) | 97 |
| Fumaric acid | 16.5 |
| Polysorbate 60 | 2.5 |
| Water | 210 |

The above ingredients are mixed and heated in a steam jacketed kettle to a temperature of about 160° F. while agitating using a Lightnin Mixer and the mixture is held at 160° F. for about 5 minutes until all the solids are fully dissolved. Thereafter the solution (solids content about 60%) is cooled to about 115° F. and maintained at this temperature while it is fed slowly into a double drum steam heated vacuum dryer in which a thin film of the solution is applied to the rolls which have been adjusted to provide a gap of about 0.01 inches there between. The drum dryer is operated using a steam pressure on the rolls of 10-15 psig and on overall vacuum gauge of about 26-27 ins. of mercury in the drying chamber. The dried product is scraped continuously from the rolls using a doctor blade and the dried, flaky, cold water soluble gelatin is collected. The dried material is then ground gently in a slow speed rotating disc grinder and sifted through a 30 U.S. mesh screen to provide a cold water soluble gelatin powder. The resulting powder was found to have a moisture content of 1.73 percent and to have the following particle size distribution.

| Screen | grams | percent by wt. |
|---|---|---|
| #40 | 3.6271 | 7.25 |
| #50 | 7.9536 | 15.92 |
| #60 | 4.2766 | 8.55 |
| #100 | 10.6115 | 21.22 |
| #140 | 7.1743 | 14.35 |
| Pan | 16.3569 | 32.71 |
| Total | 50.0000 | 100.00 |

EXAMPLE 2

This example describes the preparation of further cold water soluble gelatin products according to the invention.

Using exactly the procedure and proportions (but double the amounts) of ingredients described in Example 1, a dry blend of solids is prepared. One half of the batch (Run 2A) is treated exactly as described in Example 1 to prepare a cold water soluble gelatin. The other half of the batch (Run 2B) is treated in exactly the same manner with the sole exception that the solution, after heating to 160° F. and cooling to 115° F., is held at about 119° F. for 18 hours before being subjected to the drying, grinding and sifting operation. The resulting materials were found to have the following particle size distributions.

| Cold Water gelatin | Screen No. | Grams retained | % by weight |
|---|---|---|---|
| 2A | 40 | 1.19 | 2.52 |
|  | 50 | 6.25 | 13.19 |
|  | 60 | 4.16 | 8.78 |
|  | 100 | 17.71 | 37.39 |
|  | 140 | 9.40 | 19.84 |
|  | Pan | 8.66 | 18.28 |
|  | Total | 47.37 | 100.00 |
| 2B | 40 | 1.02 | 2.24 |
|  | 50 | 5.56 | 12.21 |
|  | 60 | 3.01 | 6.61 |
|  | 100 | 9.77 | 21.46 |
|  | 140 | 9.13 | 20.05 |
|  | Pan | 17.04 | 37.43 |
|  | Total | 45.53 | 100.00 |

EXAMPLE 3

This example describes the preparation of a further cold water soluble gelatin product according to the invention. A solution is prepared by admixing the following materials.

| Ingredients | Parts |
|---|---|
| Corn syrup 26 DE (77.5% solids) | 506.13 |
| Gelatin 240 + bloom (91% solids) | 97 |
| Tween 60 | 3.75 |
| Water | 210.26 |

The above ingredients are mixed and a solution is prepared therefrom using the procedure and equipment described in Example 1. After formation of the solution the latter is cooled to about 120° F. and maintained at this temperature for a period of 3 hours. At the end of this time 16.5 parts of fumaric acid and the solution is then dried, ground and sieved using the procedure and equipment described in Example 1. The resulting cold water soluble gelatin powder is found to have the following particle size distribution.

| Screen No. | grams retained | percent by weight |
|---|---|---|
| 40 | 1.86 | 3.72 |
| 50 | 4.58 | 9.16 |
| 60 | 2.97 | 5.94 |
| 100 | 8.69 | 17.37 |
| 140 | 7.13 | 14.25 |
| Pan | 24.79 | 49.56 |
| Total | 50.02 | 100.00 |

EXAMPLE 4

This example illustrates the preparation of cold water soluble dry gelatin dessert mixes from the cold water soluble gelatins prepared as described in Examples 1-3. The ingredients and proportions used in all cases are as follows:

| Ingredient | Parts |
|---|---|
| Cold water soluble gelatin | 39.43 |
| Cold water soluble fumaric acid | 0.38 |
| Sugar | 43.64 |
| Sodium citrate | 1.30 |
| Ascorbic acid | 0.05 |
| Spray dried flavor | 0.16 |
| F D and C color | 0.04 |
| Antifoam agent | 0.20 |

The above ingredients are dry blended into a homogeneous blend to provide the cold water soluble dry gelatin dessert mix. A gelatin dessert is prepared by adding 16 fluid ounces of cold water at about 55° F. to the dessert mix prepared as described above and stirring for 3 minutes with a spoon. The resulting solution is then placed in dessert cups and put into a conventional refrigerator at about 42° F. The solution is then held for a period of about one hour. The finished gelatin dessets so prepared exhibit smooth, spoonable gels and are of a consistency suitable for consumption.

The following tests were carried out in respect of each of the desserts prepared as described above.

Dispersion time: The time in seconds required for a measured amount of mix to disperse in water under standardised conditions.

Amount of surface skin: Depth of skin in millimeters on the surface of the aqueous dispersion obtained in the dispersion test.

Foam rating: Amount of foam, on a rating of 1=excellent (no foam) to 5=poor (much foam), produced during the dispersion test.

Strength of gel: Penetrometer test to determine the distance in millimeters into the gel penetrated by the apex of a 25 g. cone resting under gravity on the surface of the gel in respect of the following:
(a) gel formed in bloom cup and maintained for 1 hr. at 10°.
(b) same as (a) after 1.5 hr.
(c) gel formed in cup ("dish") surmounted by an inverted dish with the gel extending above the rim of the cup, the gel above the rim being sliced off before testing.
(d) gel prepared in a dessert cup and tested after 1 hour without removing the top surface.

The following results were obtained.

| Cold water gelatin | Dispersion time:secs | Surface skin mm. | Foam Rating | Penetrometer Reading (mm) 10° Bath Dish Cup | | | |
|---|---|---|---|---|---|---|---|
| | | | | 1 hr | 1.5 hr | 1 hr | 1 hr |
| Ex. 1 | 6 | 0.5 | 2.5 | 223 | 201 | 201 | 209 |
| Ex. 2A | 12 | 0.5 | 1 | 226 | 209 | 248 | 212 |
| 2B | 9 | 0 | 1 | 264 | 251 | 285 | 268 |
| 3 | 6 | 0 | 2.0 | 243 | 224 | 277 | 238 |

What is claimed is:

1. A process for preparing a cold water soluble gelatin product comprising:
   preparing an aqueous solution comprising water, gelatin, a sugar selected from the group consisting of corn syrup solids, maltodextrin and mixtures thereof, an acid and an amount of surface-active agent effective to increase dispersibility in the final product, the ratio by weight of said sugar to gelatin being in the range of about 2:1 to about 12:1, the amount of said acid being about 0.05 to about 0.5 parts by weight per part by weight of gelatin, and the total solids concentration of said solution being in the range of about 30% to about 70% by weight;
   drying the solution so prepared; and
   comminuting and screening the dried material so obtained to a particle size from about 20 to about 200 US mesh wherein at least about 40 percent by weight of the particles will pass through US mesh greater than 100.

2. A process according to claim 1 wherein at least 90 percent of the particles in the dried material will pass through US mesh 30 and will be retained on US mesh 200.

3. A process according to claim 1 wherein the drying is accomplished using a vacuum drum drier.

4. A process according to claim 1 wherein the ratio by weight of sugar to gelatin is in the range of about 3:1 to about 7:1.

5. A process according to claim 1 wherein the acid is selected from the group consisting of fumaric, adipic and citric acids.

6. A process according to claim 1 wherein the surface-active agent comprises a member selected from the group consisting of polyoxyethylene (20) sorbitan monostearate, polyoxyethylene (20) sorbitan monooleate, polyoxyethylene (20) sorbitan tristearate, and mixtures thereof.

7. A process according to claim 1 wherein the weight ratio of acid to gelatin is within the range of about 0.10:1 to about 0.23:1.

8. A cold water soluble gelatin product produced in accordance with the process of claim 1.

9. A gelatin dessert mix comprising a cold water soluble gelatin product prepared in accordance with the process of claim 1, an acid, a buffer, flavoring material and coloring material.

10. A gelatin dessert mix according to claim 9 wherein the buffer is employed in an amount effective to adjust the pH of an aqueous solution of the gelatin dessert mix to a value within the range of about 3 to about 4.5.

11. A gelatin desert mix according to claim 9 wherein additional sugar is admixed therein to bring the total sugar to gelatin ratio by weight within the range of about 8:1 to about 15:1.

12. A gelatin dessert mix according to claim 9 wherein the cold water soluble gelatin product has a bulk density of about 0.2 to about 0.3 grams per cubic centimeter.

13. A gelatin dessert mix according to claim 9 which is capable of completely dissolving in tap water in less than about 5 minutes with vigorous stirring.

* * * * *